United States Patent [19]

Webster

[11] 4,177,743

[45] Dec. 11, 1979

[54] SEEDLING TRANSPLANTER

[76] Inventor: Herschel L. Webster, Rte. 1, Cleveland, Ga. 30528

[21] Appl. No.: 888,131

[22] Filed: Mar. 20, 1978

[51] Int. Cl.² .................................. A01C 11/02
[52] U.S. Cl. .................................. 111/3; 111/52; 111/87; 172/176; 172/531; 172/555; 172/604; 172/677
[58] Field of Search .................. 111/1, 2, 3, 33, 52, 111/54, 84, 85, 87, 89, 7, 59, 62; 172/531, 534, 538, 540, 548, 555, 576, 677, 64, 176, 604, 533, 532, 131

[56] References Cited

U.S. PATENT DOCUMENTS

| | | | |
|---|---|---|---|
| 892,967 | 7/1908 | Thomas | 172/555 X |
| 1,058,140 | 4/1913 | Beene | 172/534 X |
| 2,223,559 | 12/1940 | Fleming | 111/89 |
| 2,486,462 | 11/1949 | Carelock | 111/89 X |
| 2,695,577 | 11/1954 | Webster | 111/3 X |
| 2,765,756 | 10/1956 | Webster | 111/3 |
| 3,097,616 | 7/1963 | Arnold | 111/3 |
| 3,261,310 | 7/1966 | Cronk et al. | 111/3 |
| 3,306,239 | 2/1967 | Martin | 111/1 |
| 3,643,611 | 2/1972 | Owens et al. | 111/2 |
| 3,878,901 | 4/1975 | Robertson | 172/776 X |
| 3,931,774 | 1/1976 | Bradley | 111/3 |
| 4,091,751 | 5/1978 | Dri et al. | 111/2 |

FOREIGN PATENT DOCUMENTS 1086077  7/1960  Fed. Rep. of Germany ........ 172/531

Primary Examiner—Clifford D. Crowder
Assistant Examiner—James R. Feyrer
Attorney, Agent, or Firm—Clarence A. O'Brien; Harvey B. Jacobson

[57] ABSTRACT

A seedling transplanter has a main frame securable to a drawing vehicle by a draft bar and supported for movement over a piece of ground in which seedlings are to be planted. Coulter assemblies are mounted on the main frame for cutting a furrow as the frame transverses the ground, with each of the coulter assemblies including a disk having a substantially planar main portion and a bent portion, with the amount of bend of the latter portion determining the width of the furrow. The draft bar is pivotally mounted on the main frame for swinging movement in a substantially vertical plane so as to permit the transplanter to traverse rocks and similar objects within the soil without the coulter disks being lifted from the ground, with a stop being provided on the draft bar for permitting the conventional lift provided on the towing tractor to cause the coulter assemblies to be disengaged from the ground as desired. When wheels are employed to support the main frame on the ground or other surface being traversed, such wheels are mounted in a simple manner for individual toe adjustment in order to permit the toe of the wheels to be set such as to facilitate towing of the transplanter.

12 Claims, 6 Drawing Figures

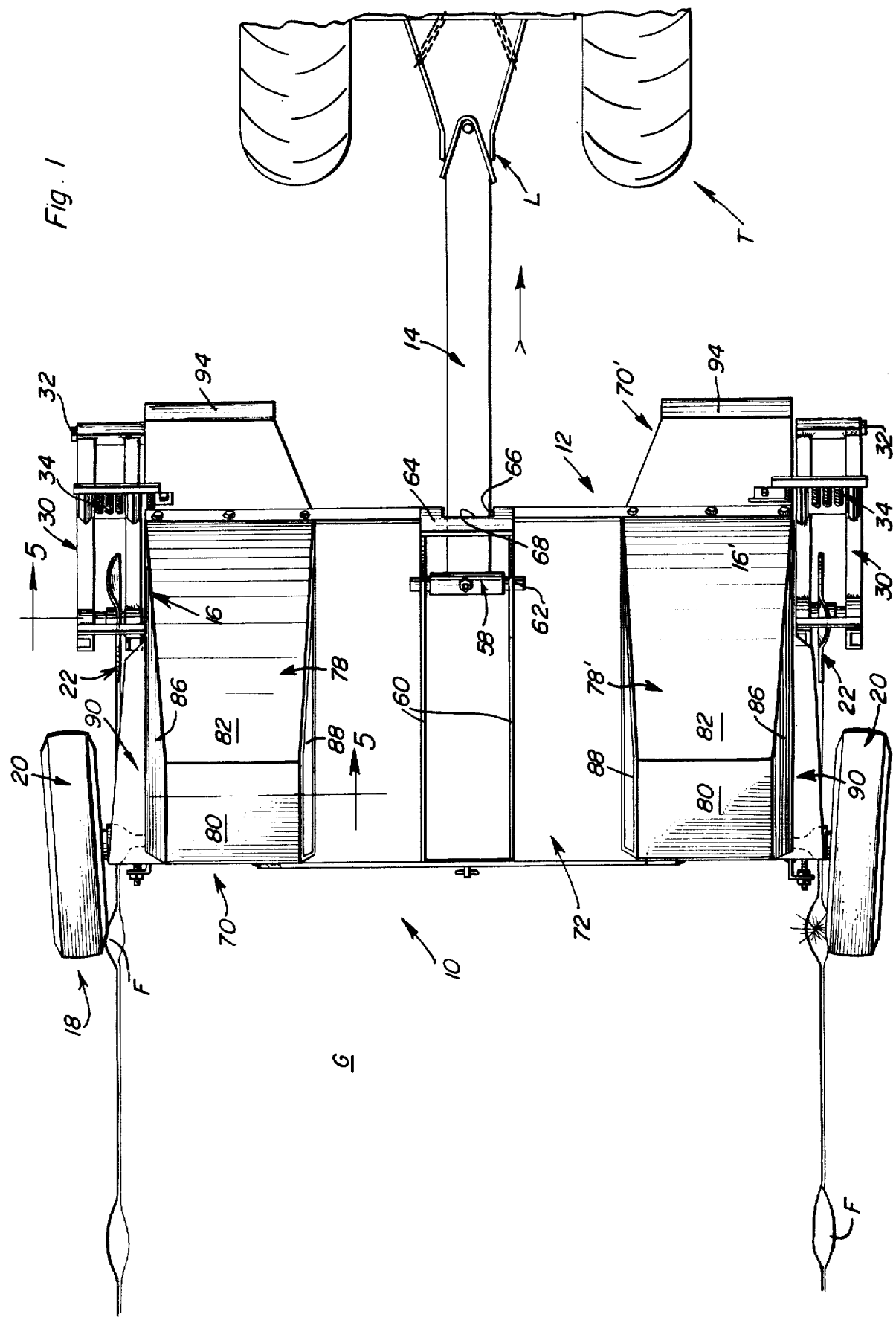

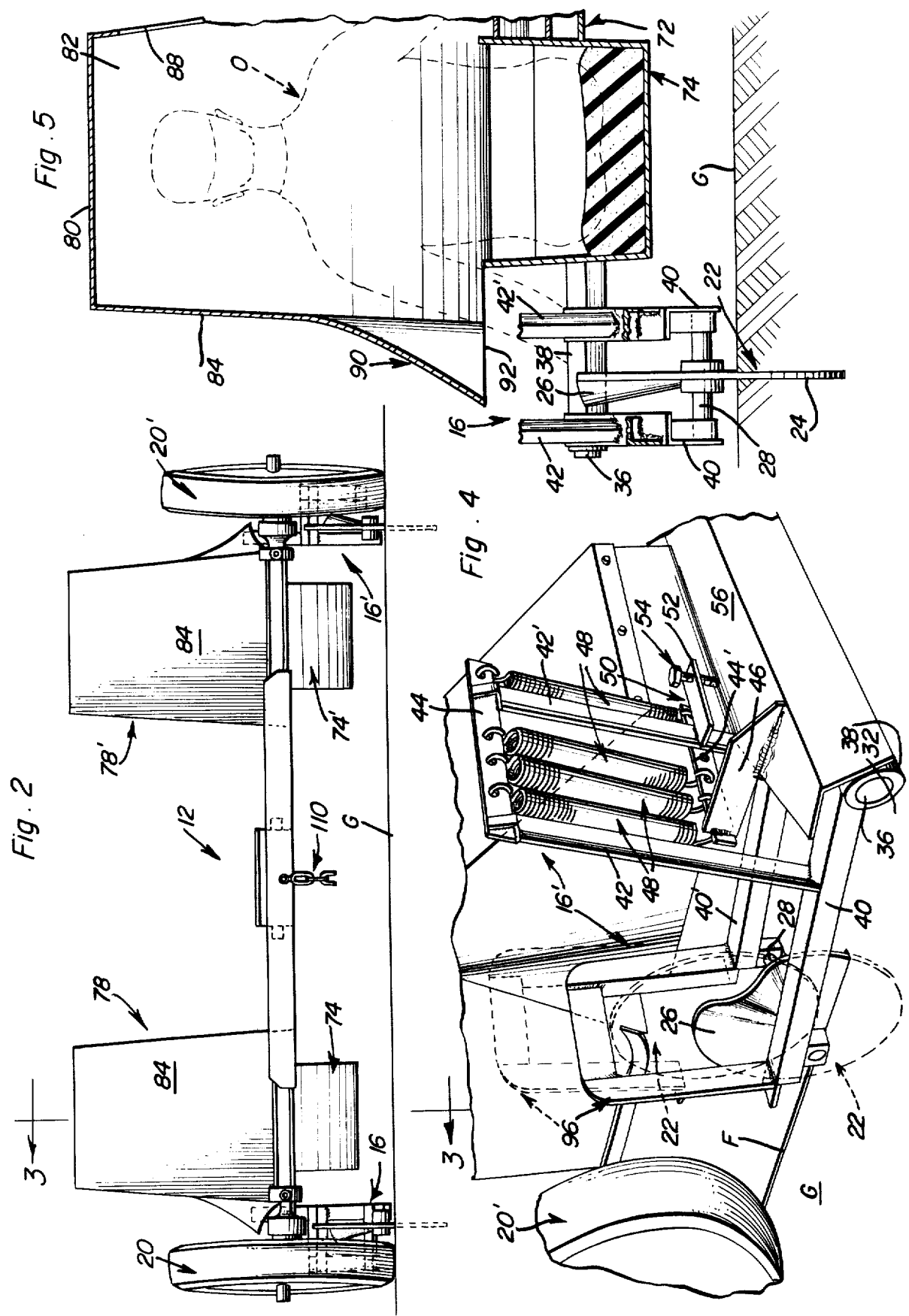

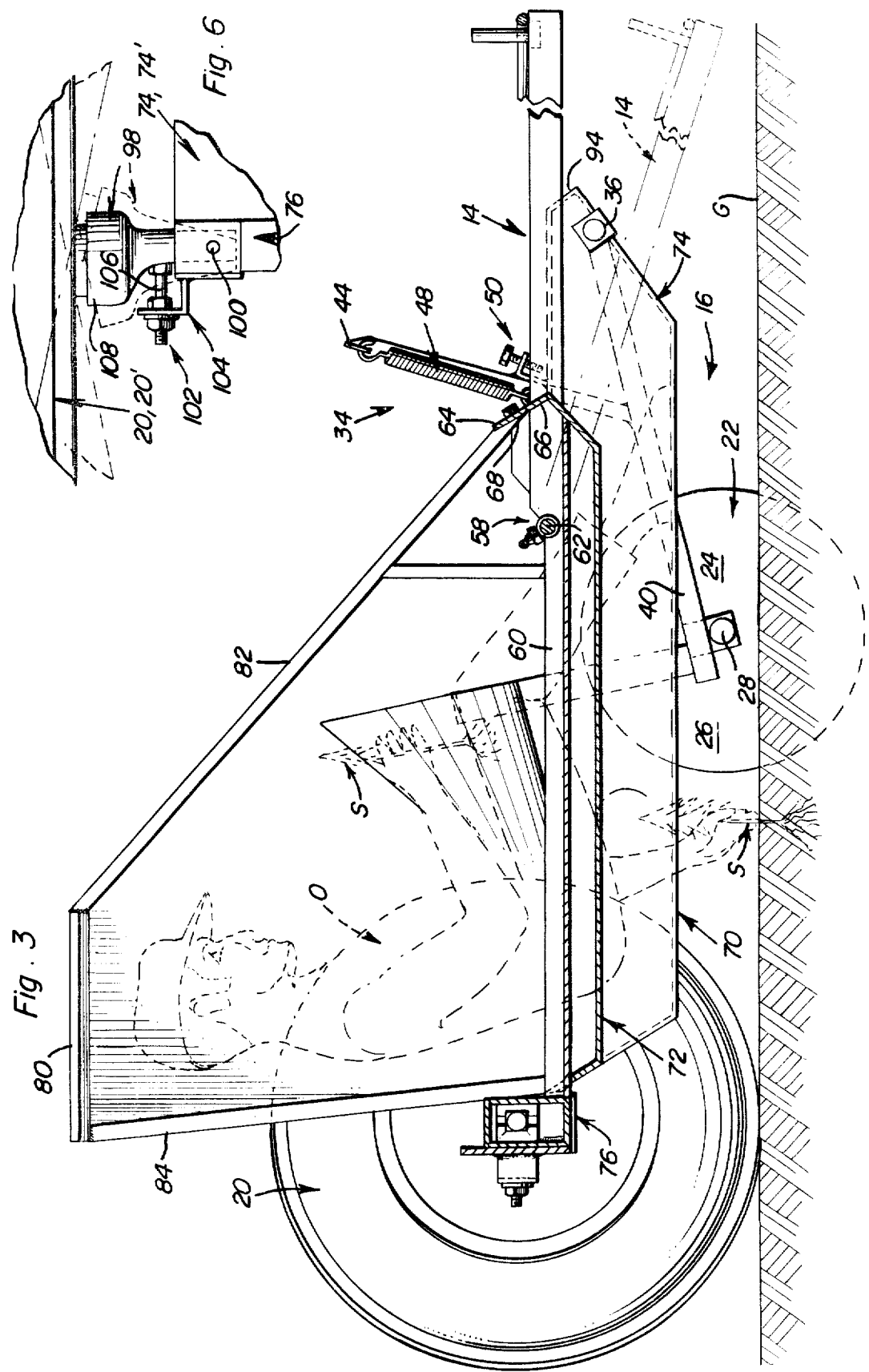

SEEDLING TRANSPLANTER

BACKGROUND OF THE INVENTION

1. Field of the Invention

This invention relates generally to transplanters, and particularly to an attachment for a farm tractor, and the like, for efficient transplanting of seedlings, and the like.

2. Description of the Prior Art

My prior U.S. Pat. Nos. 2,695,577, issued Nov. 30, 1954, and 2,765,756, issued Oct. 9, 1956, disclose transplanting devices which include coulter, or cutter, disks and cooperating fixed blades arranged for making a furrow which receives seedlings to be planted, and subsequently packs the soil adjacent the seedlings without damaging the plants themselves.

One difficulty encountered with the transplanter disclosed in my prior U.S. Pat. No. 2,765,756 is that the angled coulter disk tends to push the towing tractor sideways, thus making it impractical to employ only a single coulter disk with such a transplanter.

U.S. Pat. Nos: 2,223,559, issued Dec. 3, 1940, to D. T. Fleming; 2,486,462, issued Nov. 1, 1949, to C. L. Carelock; 3,097,616, issued July 16, 1963, to H. N. Arnold; 3,306,239, issued Feb. 28, 1967, to W. Martin, Jr.; and 3,643,611, issued Feb. 22, 1972, to E. G. Owens, et al., disclose additional examples of transplanting devices representative of the prior art and including various features of interest to the present invention.

SUMMARY OF THE INVENTION

It is an object of the present invention to provide a seedling transplanter that can be used as a one row machine without tending to pull the towing vehicle sideways.

It is another object of the present invention to provide a seedling transplanter that will permit the efficient planting of seedlings in rough terrain, including land covered with logs, roots, stumps, rocks, and similar obstacles.

Still another object of the present invention is to provide a seedling transplanter which protects the persons actually planting the seedlings from dust and like elements so as to permit more continuous and concentrated operation of the transplanter.

These and other objects are achieved according to the present invention by providing a seedling transplanter having: a main frame securable to a drawing vehicle by a draft bar pivotally mounted on the main frame; a coulter assembly mounted on the frame for cutting a furrow as the frame traverses a piece of ground in which seedlings are to be planted; and a ground-engaging frame-supporting arrangement mounted on the main frame is spaced relation from the draft bar for closing the furrow formed by the coulter assembly, with the coulter assembly being arranged between the draw bar and the frame supporting arrangement.

The coulter assembly preferably includes a coulter disk having a straight main portion and a bent portion, with the latter advantageously being less than one-half of the face of the disk and the amount of bend thereof determining the width of a furrow dug by the coulter disk. The coulter arrangement further includes a coulter frame pivotally mounted on the main frame of the transplanter, with the coulter disk being mounted on a shaft partly forming the coulter frame in such a manner that the main portion of the disk is disposed substantially parallel to a normal direction of forward movement of the main frame.

The coulter frame advantageously includes, in addition to the aforementioned shaft, a framework pivotally mounted on the main frame at a pivot axis spaced from the frame supporting arrangement as well as the point of pivotal attachment of the draft bar, and the aforementioned shaft being mounted on the framework at a point spaced from the pivot point of the framework and toward the frame supporting arrangement. A resilient device is connected to and arranged extending between the main frame and the framework of the coulter frame for reducing shock to the main frame and permitting the coulter disk to pass over obstacles in pieces of ground covered by the main frame. A resilient device advantageously includes at least one spring arranged extending between the main frame and a crossbar partially forming the coulter frame and attached to the framework of the coulter frame by a pair of generally upstanding posts. An adjustment bolt can be provided on one of these posts so as to engage with the main frame and permit adjustment of the downward swing of the coulter disk.

The draft bar is pivotally mounted on the main frame for swinging movement in a vertical plane so as to permit the main frame to ride over large obstacles without raising the towing vehicle. In addition, a stop member advantageously is secured to the main frame and arranged over the draft bar for limiting the upward swinging movement of the draft bar and permitting the coulter assembly to be moved out of engagement with the ground by use of the conventional lift hitch of the tractor or other similar towing vehicle.

The main frame advantageously includes at least one seat portion in a substantially planar platform portion, with the seat portion being provided with an operator-receiving receptacle extending beneath the plane of the platform portion toward the ground. In this manner, the platform portion forms an arch in cooperation with the seat portion for clearing ground and obstacles between rows of a field, while still permitting a planter riding in the seat portion to be disposed sufficiently close to the ground for efficiently carrying out the planting operations. Preferably, there are a pair of seat portions associated with the platform portion with the seat portions arranged on either side of the platform portion. Further, each of the seat portions preferably are provided with a protective cover, or cab, comprising a roof and a side wall spaced from the platform portion. The cover is provided with an opening adjacent the platform portion for permitting access to the interior of the seat portion, while a chute is provided in the side wall spaced from the platform portion for permitting the operator disposed within the seat portion of the transplanter main frame to place the seedlings into the furrow opened by the associated coulter assembly.

The frame supporting arrangement preferably includes a pair of spaced wheels arranged substantially coaxially on lateral sides of the main frame, with the wheels being mounted on the main frame for pivotal movement about an axis substantially perpendicular to the plane of the platform portion of the main frame, as well as to the surface on which the associated one of the wheels is resting. An adjustable stop element is mounted on the main frame so as to engage a hub of an associated one of the wheels for limiting pivotal movement of the wheel away from the coulter means and permitting formation of an outward toe to the wheel. In this manner, a suitable outward toe can be set on the wheels for pulling soil back in a furrow that the coulter has opened out, and pushed out when opening the furrow, and have plenty of soil for packing around the seedlings.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

FIG. 1 is a schematic, fragmentary, top plan view showing a seedling transplanter according to the present invention being towed behind a conventional tractor, and the like.

FIG. 2 is a rear elevational view of the transplanter seen in FIG. 1, but with the tractor removed.

FIG. 3 is an enlarged, sectional view taken extending along the line 3—3 of FIG. 2.

FIG. 4 is an enlarged, fragmentary, perspective view showing the lower portion of the seedling transplanter as seen in FIG. 1.

FIG. 5 is an enlarged, fragmentary, sectional view taken generally along the line 5—5 of FIG. 1.

FIG. 6 is an enlarged, fragmentary, detail view showing the manner in which the wheel can be mounted to the frame of a transplanter according to the present invention.

DESCRIPTION OF THE PREFERRED EMBODIMENTS

Referring now more particularly to FIGS. 1 through 5 of the drawings, a seedling transplanter 10 according to the present invention includes a main frame 12 having a draft bar 14 securable to a conventional power lift L provided on a drawing vehicle such as a tractor T. Coulter assemblies 16 and 16' are mounted on frame 12 for cutting furrows F as frame 12 traverses a piece of ground G. A ground-engaging frame-supporting arrangement 18 is mounted on frame 12 in spaced relation from draft bar 14 for closing the furrow F, with the coulter assemblies 16, 16' being arranged between the draft bar 14 and the arrangement 18. As illustrated, arrangement 18 comprises a pair of packing wheels 20 and 20' disposed on either lateral side of frame 12.

Each coulter assembly 16, 16' includes a coulter disk 22 having a straight main portion 24 and a bent, dished-out or radially extending wave portion portion 26 on the periphery thereof. That is, portion 24 comprises substantially more than one-half of the face area of disk 22, with the degree of bending of portion 26 determining the width of a furrow F dug by the disk 22. The assembly 16, 16' has a frame which includes a shaft 28 on which disk 22 is mounted for rotation therewith, with the main portion 24 of the disk 22 being disposed substantially parallel to the forward direction of movement of frame 12. The usual forward direction of movement of frame 12 is indicated by the direction arrow in FIG. 1.

As will be appreciated, the construction and arrangement of the disk 22 as described above will permit a transplanter according to the present invention to be constructed with only a single coulter assembly. The disk 22 will roll straight, for example, about two-thirds of the time and one-third of the time will open a place to plant a seedling S. The width of this opening is determined by the amount of offset in disk 22 as formed by bent or radial wave portion 26, and thus the need for angular adjustment of the coulter disk is eliminated. Not only does this make the spacing correct depending on the size of the coulter disk, one seedling being planted every rotation of the disk, but the disk will not tend to pull the towing tractor T sideways. Further, a fixed cutter blade along the side of the coulter disk is not needed in conjunction with an arrangement in accordance with the present invention, because the bent portion 26 of coulter disk 22 firms the soil at a slope just before it opens the slot for the seedling to be planted. This packing or firming of the soil at a slope keeps it from caving or falling into the furrow when the disk rolls forward and opens the planting furrow. The straight side, or main portion 24, of a coulter disk 22 functions as a fixed cutter blade, and is much better thereas because there is no clogging of such a disk, which clogging with the conventional fixed cutter blade can cause many delays. In addition, because coulter disk 22 is running straight, the seedling transplanter 10 is much easier to pull, does not plow a trench or furrow, and will not "wash" the soil even when the device is going up or down hills and not running along the contour of the land. A coulter disk 22 and its associated bearings, axle or shaft, and supporting frame, are less subject to stress and wear than similar elements provided on a seedling transplanter employing the conventional angled coulter disk.

The frame of each coulter assembly 16, 16' further comprises a framework or subframe 30 pivotally mounted on main frame 12 at a pivot axis 32 disposed forwardly of the pivot axis of draft bar 14, with shaft 28 being mounted on framework 30 at a point spaced from pivot axis 32 in the direction toward the supporting arrangement 18. Further, each of the coulter assemblies 16, 16' includes a resilient device 34 connected to and arranged extending between main frame 12 and framework 30 for reducing shock to frame 12 and permitting the associated coulter disk 22 to pass over obstacles in a piece of ground being covered by frame 12.

Pivot axis 32 of each coulter assembly 16, 16' is defined by a rod 36 affixed to frame 12 in a suitable manner and having journaled thereon a sleeve 38. Framework 30 has a pair of substantially parallel, coextending, spaced, rails 40, 40' extending from sleeve 38 and mounting at the other ends thereof an associated shaft 28 as by suitable bearings, and the like.

The resilient device 34 includes a pair of posts 42, 42' extending coextensively away from respective rails 40, 40', with a crossbar 44 extending between the posts 42, 42' at the uppermost ends thereof. A crossbar 44', similar to crossbar 44, is mounted on main frame 12 as by the illustrated cantilever 46, with one or more tension springs 48 being arranged extending between the crossbars 44 and 44'. By this arrangement, it will be appreciated that a bias is placed on framework 30 for the latter to swing the associated disk 22 downwardly.

The downward swing of disk 22 can be limited by an adjustable stop 50 including a bracket 52 provided on post 42' and having a threaded aperture which threadingly receives a bolt 54 that selectively engages with apron 56 of main frame 12. By adjustment of the bolt 54 relative to bracket 52, the amount of downward swing of disk 22 can be limited as desired.

The hinged, or pivotally mounted, framework 30 of each assembly 16, 16' permits the wheels 20, 20' to do a better job of packing soil around planted seedlings S, with it being possible for the coulter disk 22 to move upwardly and run or roll over obstacles without raising the packing wheels 20, 20' off of ground G so as to prevent the wheels from functioning. The travel speed of the device can also be increased because of less shock. This makes seedling transplanter 10 easier to pull, because the frame 12 will not hang on or under obstacles and require one side of the transplanter to be raised up for removal, with resulting delays.

Draft bar 14 is pivotally mounted on frame 12 as by the bearing 58 to which bar 14 is affixed, with bearing 58 being disposed between a pair of substantially parallel, coextensive ribs 60 which mount a pin 62 therebetween. Bearing 58 can be a conventional bearing sleeve provided with a lubricating fitting. The resulting swinging movement in a vertical plane of draft bar 14 permits main frame 12 to ride over large obstacles without raising the tractor T. Further, a stop member in the form of a shield 64 provided with a slot 66 through which draft bar 14 extends is arranged with an edge 68 of slot 66 over draft bar 14 for limiting upward swinging movement of bar 14 and permitting the coulter assemblies 16, 16' to be moved out of engagement with the ground G when lift L moves the forwardmost end of draft bar 14 upwardly. The stop formed by the slot 66 in shield 64 cooperates with the stop 50 of the coulter assemblies 16, 16' to lift the front end of frame 12 upwardly while simultaneously preventing continued downward swinging of the coulter disk 22. In this manner, transplanter 10 can be more readily towed when not engaged in a planting operation.

Main frame 12 includes a pair of seat portions 70 and 70' and a substantially planar platform portion 72. While a pair of seat portions are illustrated, it is to be understood that a transplanter according to the invention can be constructed with only one seat portion if desired. Each of the seat portions 70, 70' is provided with a receptacle 74, 74', respectively, arranged for receiving an operator O, which receptacle extends beneath the plane of platform portion 72 so as to be immediately adjacent ground G. By this arrangement, platform portion 72 forms an arch in cooperation with the seat portions 70, 70' for permitting the frame 12 to clear ground and obstacles between rows of a field, and the like. A beam 76 extends entirely across frame 12 at the rear or trailing end thereof for rigidifying the connection between the seat portions 70, 70' and platform portion 72.

Preferably, the raised or arched center platform portion 72 of frame 12 is about two-thirds of the width of transplanter 10, and enables the transplanter 10 to straddle obstacles and not drag or raise up the coulter disk 22 and packing wheels 20, 20' so as to interfere with the planting and packing process. Further, this raised center makes the seedling transplanter 10 much easier to pull, because it will not be dragging on the ground G and other obstacles. In addition, the frame 12 will not hang up on obstacles encountered. To enhance this desirable function of the invention, the front of each seat portion 70, 70' is sloped or angled to enable frame 12 to slide on and over obstacles without hanging up, while the back or rear portions of the receptacle 74, 74' are sloped so as not to slide down and jolt or jump over such obstacles.

Each of the seat portions 70, 70' includes a protective cab or cover 78, 78', respectively, each of which covers 78, 78' comprises a roof 80, a downwardly sloping front wall 82, and a forwardly sloping back wall 84, together with a side wall 86 on the outer side, or that side spaced fartherest from the platform portion 72. Each cover 78, 78' is provided with an opening 88 on the side thereof adjacent platform portion 72 for permitting access to the interior, or receptacle 74, 74', of the associated seat portion 70, 70' and permit an operator O to get into and out of the associated receptacle 74, 74'. Side wall 86 has provided thereon a chute 90 having an open bottom 92 which permits an operator O to insert the seedlings S into an opening made therefor in ground G by each revolution of the associated coulter disk 22.

As mentioned above, the front edge 94 of each of the seat portions 70, 70' advantageously comes substantially to a point in order to facilitate passage of frame 12 over obstacles, and the like, which may be encountered as traversing rough ground and the like.

Each of the frameworks 30 have associated therewith a generally U-shaped member 96 arranged adjacent the associated shaft 28 so as to extend upwardly and over the periphery of the respective disks 22. This member 96 functions to bias downwardly the associated disk 22, while also facilitating manual manipulation of the respective coulter assemblies 16, 16'.

As can best be seen with reference to FIG. 6 of the drawings, each wheel 20, 20' of supporting arrangement 18 includes a hub 98 mounted on main frame 12 by an associated stud 100 for pivotal movement about an axis substantially perpendicular to the plane of platform portion 72, and to the surface of ground G on which the associated wheel 20, 20' is resting. An adjustable stop element 102 includes a bracket 104 affixed to main frame 12 and provided with a screw threaded hole in which is threadingly received a bolt 106 having thereon a pair of nuts 108 which permit adjustment of the length of bolt 106 which engages against an associated hub 98 in order to limit pivotal movement of the associated wheel 20, 20' away from the coulter assemblies 16, 16' and permit determination of the toe of the wheels 20, 20'. By this arrangement, the desired set of the packing wheel can be readily made or eliminated, thus permitting the wheels to be outwardly toed away from the coulter disk 22 for pulling back soil that the coulter disk 22 pushed out when opening a furrow, and assuring that sufficient soil is available for packing around the seedlings. If the width of the furrow is increased, the toe out of the wheel 20, 20' might need to be increased.

A scraper (not shown) can be provided on the coulter disks for removing soil from them. Sometimes the coulter disks tend to pick-up dirt it has opened, or the soil sticks to the blades, and inadequate soil will be left for packing around the seedlings unless the disks are scraped.

SUMMARY

As can be readily understood from the above description and from the drawings, a seedling transplanter according to the present invention permits efficient seedling planting in all kinds of terrain and weather. The covers, or cabs, enable an operator to continue to work when rain or cold would otherwise stop the planting operation, and an operator can do a better job of planting because it is more comfortable. The back wall of the cab or cover makes a good backrest, especially when the towing tractor power lift is in the raised position. In addition, the planter operator can remain in position within the seat portion of the transplanter even when the device is passing through rough places, such as those containing roots, limbs, logs, rocks, briars, weeds, and the like, without having to get out of the transplanter and wait to one side until the machine has passed over or by such obstacles. The operator can easily place the seedlings in position by reaching down through the open bottom of the chute provided in the outer side walls of the cab, or cover, of each seat portion provided on the transplanter, while the relatively close position of the packing wheels behind the point of placement of the seedlings helps to assure proper packing of the soil against the newly placed plant.

In addition, while the invention has been disclosed herein as employing a pivotally mounted draft bar for connection to a towing vehicle, it is to be understood that other forms of connection, such as a chain or other flexible element, can be employed to effect the attachment. In addition, the frame may be supported on runners, and the like, in place of the herein disclosed packing wheels, while a particularly advantageous feature of the invention is the ability to employ only a single coulter assembly without running into the difficulty of the coulter disk causing the towing vehicle to be pulled sideways. A chain 110 can be attached to the rear of the main frame 12, as seen in FIG. 2 of the drawings, in order to permit an attachment of other implements to the transplanter itself.

The foregoing is considered as illustrative only of the principles of the invention. Further, since numerous modifications and changes will readily occur to those skilled in the art, it is not desired to limit the invention to the exact construction and operation shown and described, and accordingly all suitable.

What is claimed as new is as follows:

1. A seedling transplanter including frame means, ground-engageable wheel means journaled from said frame means for rolling support of said frame means from a ground surface and movement of said frame means over the ground surface along a first path in a predetermined orientation relative to said frame means, said wheel means including a plurality of journaled wheels, at least one of said wheels being angularly positioned relative to said path, a substantially planar coulter disk journaled from said frame for rotation about an axis disposed at substantially right angles relative to said path and positioned ahead of said one wheel in the direction of intended movement of said frame means along said path, said coulter disk being disposed at an elevation to knife through the upper layer of said ground along a second path paralleling the first path and spaced slightly to the side of the track of said one wheel toward which the rear portion of said one wheel is angled, said coulter disk including a generally radially extending wave therein defined by successive reversely curving peripheral portions of said disk, said wave projecting outwardly from the plane of the remainder of the disk toward the side of said second path on which said one wheel is disposed.

2. The combination of claim 1 wherein said frame means includes a main frame from which said wheel means are journaled and a subframe movably supported from said main frame and including a portion thereof vertically shiftable relative to said main frame, said coulter disk being journaled from said portion of said subframe.

3. A seedling transplanter including an elongated main frame including forward, intermediate and rear portions, ground-engaging support wheels journaled from said rear portion, an elongated towbar including a first rear end pivotally supported from said main frame intermediate portion for oscillation relative thereto about a first horizontal transverse axis and a second forward end for connection with a towing vehicle, a unitary subframe including front and rear end portions disposed forward and rearward of said first horizontal transverse axis, the front end portion of said subframe being oscillatably supported from the front end portion of said main frame for oscillation relative thereto about a second horizontal transverse axis, a workman support structure carried by the rear end portion of said main frame, and ground-engaging furrow opening means supported from said subframe intermediate the front and rear end portions thereof, means comprising an adjustable stop bolt and bracket connected to said subframe at a point between the first and second transverse axes and operatively associated with said main frame limiting downward swinging movement of the rear end of said subframe relative to said main frame, spring means operatively connected between said main frame forward of said first horizontal transverse axis and subframe yieldably biasing said subframe to its limit position of downward swinging movement of the rear end thereof relative to the main frame.

4. A seedling transplanter, comprising, in combination:
   (a) a main frame having connector means thereon for securing the frame to a drawing vehicle;
   (b) a coulter means mounted on the main frame for cutting a furrow as the frame traverses a piece of ground in which seedlings are to be planted; and
   (c) ground-engaging frame supporting means mounted on the main frame in spaced relation from the connector means for closing the furrow after a seedling has been planted, the coulter means being arranged between the connector means and the frame supporting means, the coulter means including a coulter disk having a straight main portion and a peripheral bent portion, the bent portion determining the width of the furrow cut on each revolution of the disk, the main frame having a direction of motion, and the coulter means including a coulter frame comprising a shaft extending transversely of the main frame relative to the direction of motion of the main frame, and the coulter disk being mounted on the shaft with the main portion of the disk being disposed substantially parallel to the direction of motion of the main frame for eliminating a sideways pull on the towing vehicle, the coulter frame further including, in combination:
      (1) a framework pivotally mounted on the main frame at a pivot axis spaced from the coulter means and frame supporting means, the shaft of the coulter frame being mounted on the framework at a point spaced from the pivot axis of the framework toward the coulter means; and
      (2) resilient means connected to and arranged extending between the main frame and the framework for reducing shock to the main frame and permitting the coulter disk to pass over obstacles in pieces of ground being covered by the main frame, the main frame having a rod mounted thereon and arranged extending transversely with respect to the direction of motion of the main frame, and the framework of the coulter frame including a sleeve journaled on the rod and a pair of coextensive, spaced, substantially parallel rails, the coulter disk being disposed between the rails, with the shaft mounting the coulter disk being journaled on the rails, and the resilient means being connected to the rails between the sleeve and coulter disk for biasing the coulter disk downwardly toward ground to be planted.

5. A structure as defined in claim 4, wherein the resilient means includes a pair of posts extending codirectionally and coextensively away from the rails, a crossbar extending between the posts at points thereon spaced from the rails, and a bracket affixed to the main frame, with a further crossbar affixed to the bracket, and at least one tension spring being arranged extending between the crossbar and furhter crossbar for biasing the framework of the coulter frame.

6. A structure as defined in claim 5, wherein adjustable stop means is provided on one of the posts for engaging the main frame and limiting the downward swing and depth of penetration of the coulter disk into the ground to be planted.

7. A structure as defined in claim 6, wherein the connector means includes a draft bar pivotally mounted on the main frame for swinging movement in a substantially vertical plane and permitting the main frame to ride over large obstacles without raising the towing vehicle.

8. A structure as defined in claim 7, wherein a stop member is secured to the main frame and is arranged over the draft bar for limiting upward swinging movement of the draft bar and permitting the main frame to be raised in order to facilitate pulling of the transplanter when same is not being employed in planting operations.

9. A structure as defined in claim 8, wherein the main frame includes a seat portion and a substantially planar platform portion, with the seat portion being provided with an operator-receiving receptacle extending beneath the platform portion and toward the ground to be planted, and the platform portion forming an arch in cooperation with the seat portion for clearing ground and obstacles between rows of the ground being planted.

10. A structure as defined in claim 9, wherein the seat portion of the main frame is one of a pair of substantially identical, coextensive seat portions spaced laterally from one another, with the platform portion being disposed between and connected to the seat portions.

11. A structure as defined in claim 9, wherein the seat portion includes a protective cover comprising a roof and a side wall spaced from the platform portion, the cover being provided with an opening adjacent the platform portion for permitting access to the interior of the seat portion, and the side wall spaced from the platform portion being provided with a chute having an open bottom for permitting seedlings to be inserted into furrows opened in the ground by the associated coulter means.

12. A structure as defined in claim 11, wherein the frame supporting means includes a pair of spaced wheels arranged substantially coaxially on lateral sides of the main frame, the wheels being mounted on the main frame for pivotal movement about an axis arranged substantially perpendicularly to the surface on which the associated one of the wheels is resting, and an adjustable stop element means mounted on the main frame and engaging the wheels for limiting pivotal movement of the wheels away from the coulter means and determining the toe of the wheels in order to permit the setting of an effective angle of at least one of the wheels for packing of the planted seedlings.

* * * * *